Patented May 1, 1945

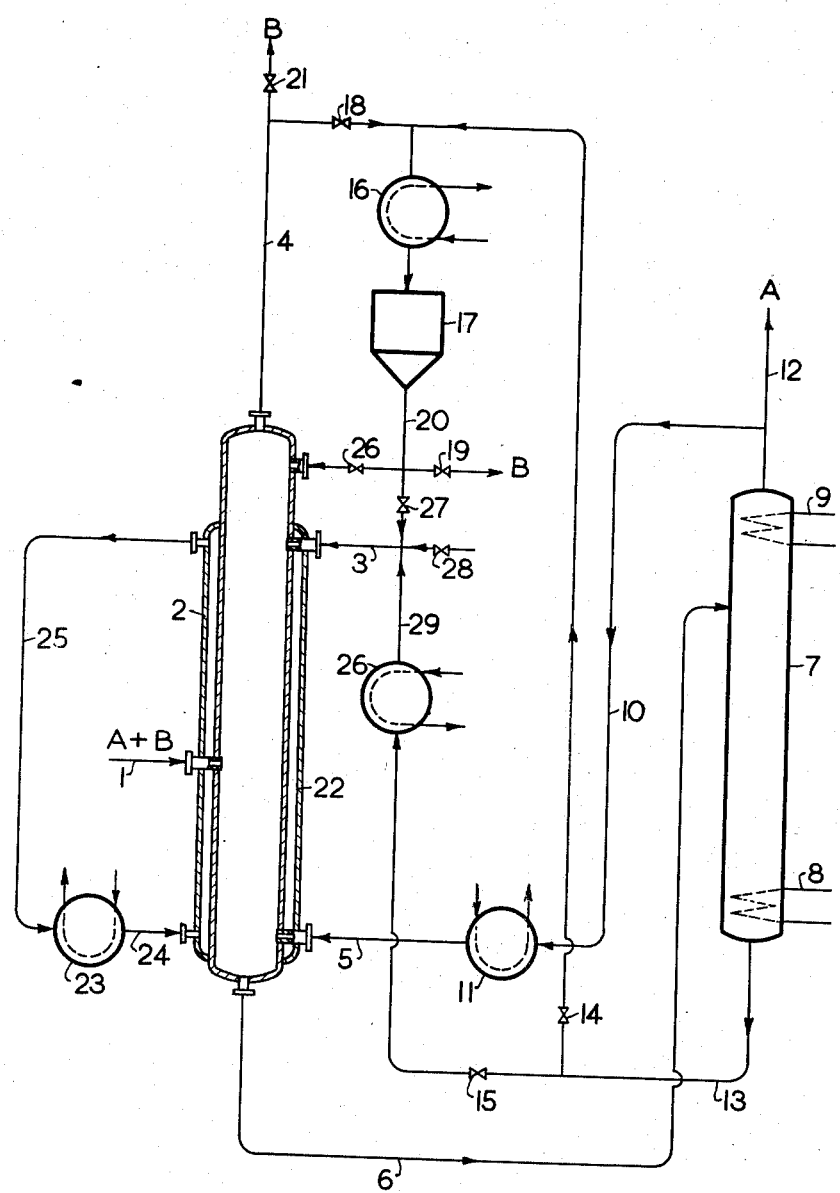

2,374,984

UNITED STATES PATENT OFFICE 2,374,984

PROCESS FOR SEPARATION OF VAPORS

Theodore W. Evans, Oakland, and Rupert C. Morris, Berkeley, Calif., assignors to Shell Development Company, San Francisco, Calif., a corporation of Delaware Application January 12, 1942, Serial No. 426,448

15 Claims. (Cl. 183—115)

This application is a continuation-in-part of our co-pending application, Serial No. 329,482, filed April 13, 1940, and the invention relates to a process for the separation, or purification, or both, of vapor mixture of narrow boiling range comprising two or more components of different chemical compositions, by contacting such a vapor mixture with a higher boiling liquid which has a preferential solvent power for certain of the components to be separated. More particularly, it deals with a method for scrubbing vapor mixtures with a suitable selective solvent for one component and refluxing the resulting fat solution under substantially isothermal conditions, with vapors of the substantially pure component of preferential solubility.

Various methods for separating vapor mixtures of narrow boiling ranges are known. For example, the scrubbing of the vapors to be separated with a selective solvent for certain constituents, in a suitable contact zone such as a packed, spray or bubble plate tower, has long been employed. Several improvements over simple scrubbing have led to the so-called "extractive distillation" in which a selective solvent for certain of the components of the vapor mixture is allowed to run down a distillation column as the mixture is fractionally distilled. The more soluble components of the vapor are withdrawn from the bottom of the still in solution in the solvent from which they can usually be readily separated, while the less soluble vapors go overhead.

In the extractive distillation there is at the bottom of the column a heat source which causes vaporization of at least a portion of the extracted components. The resulting vapors rise through the lower portion of the column in countercurrent to the descending liquid, thereby displacing from the liquid dissolved components of lower solubility, the latter eventually being withdrawn from the top of the column as undissolved vapors.

It is an object of our invention to provide a process for the separation of gaseous mixtures by vapor phase extraction into at least two component fractions with the aid of a higher boiling selective solvent for one or more of the components, which process is more efficient than similar known processes. It is a further object to provide a means which allows uniform and precise control of fractionation and selective absorption, and it is a still further object to increase the efficiency of selective vapor or gas absorbing and rectifying apparatus.

Separations of this sort are dependent upon the relative volatilities of substances to be separated. The term "relative volatility" as used herein is defined for a two component system in the presence of a higher boiling selective solvent as follows:

$$\alpha = \frac{P_1}{X_1} \bigg/ \frac{P_2}{X_2}$$

wherein $\alpha$=relative volatility.
$P_1$=partial pressure of first component.
$P_2$=partial pressure of second component.
$X_1$=mol fraction of the first component in the total liquid including the selective solvent.
$X_2$=mol fraction of the second component in the total liquid including the selective solvent.

It is known that the relative volatilities of substances are a direct measure of the ease of their separation by distillation processes. Relative volatilities vary with temperature, and for most mixtures there exists a temperature at which this relationship is most favorable for complete separation. In operating an ordinary extractive distillation there is a temperature gradient throughout the length of the contact zone. Since optimum relative volatilities exist at one temperature only it is therefore possible to take advantage of this optimum relative volatility at only one point in the zone.

Our invention corrects these difficulties and comprises a method similar to extractive distillation but differing therefrom in the maintenance of substantially uniform temperature throughout the length of the contact zone. This we achieve by contacting a vapor mixture of narrow boiling range with a selective solvent for certain components of the mixture at a uniform temperature, preferably above the dew point of the feed, to produce a fat solution and then further contacting the latter at about the same temperature with a vapor consisting of the substantially pure component of the mixture which is preferentially soluble in the solvent. Overhead vapors are condensed to provide liquid reflux, which is returned to the system as described below. We prefer to operate at a temperature near that which gives the most favorable relative volatility, which can be determined experimentally for any given mixture in the presence of various selective solvents.

The temperature of most favorable relative volatility varies for different solvents and different vapor mixtures to be separated. If it is necessary that this optimum temperature be known accurately, it must be determined experimentally for each combination. Normally it is several degrees, e. g., about 5 to 25° C. above the dew point of the reflux. Selectivity of the solvent is one of the factors determining it, and absolute solubility of the vapors in the solvent is another. In general, solubility of vapors in liquids increases with a lowering of the temperature. Selectivity may increase or decrease with temperature, depending for example on the nature of the solvent. In many cases, the selectivity increases as the concentration of dissolved material decreases, so greatest selectivity is reached coincident with no solute in solution, corresponding to an infinite consumption of solvent per pound of product. Therefore, lowering of the temperature may have an adverse effect on the resulting relative volatility of the several components contained in the vapor mixture, and in practice one must strike a balance between selectivity and solubility. Moreover, pressure must be taken into consideration, since solubility of gases in liquids increases with pressure. In general, increasing the pressure adversely affects selectivity of the solvent.

Some solvents, particularly those which form loose addition compounds with one component of the mixture, show an anomalous increase in selectivity with lowering of the temperature, or with change in pressure, or both. This increase may be so great as to overshadow all other influences. When operating our process with such a solvent it may be desirable to maintain a temperature as low as possible without causing actual condensation of the feed, i. e., to operate as close as possible to the initial condensation point of the vapor mixture. An example of the separation of a vapor mixture which is advantageously carried out at the lowest practical temperature is the separation of diolefines from hydrocarbon mixtures with the aid of cuprous chloride solutions in water or amino bases.

One of the advantages of our isothermal mode of operation may be concluded from the following explanation. If two columns are compared, to which a selective solvent is admitted to the top, one an ordinary extractive distillation column which is operated at a lower temperature at the top than at the bottom, and the other a column which is operating by maintaining a uniform temperature (which is an average between the top and bottom of the first throughout the length of the column), the following distinctions may be noted. In the first column, as compared to the second, by reason of the lower top temperature in the former, and the fact that even a "selective" solvent dissolves appreciable quantities of the less soluble component, it is found that a greater portion of the component having the higher volatility is dissolved by the selective solvent. The addition to the solvent of this component alters and normally lowers its selectivity so that it would tend to dissolve proportionately larger amounts of said less soluble compound. Consequently the selective absorption for the more soluble component would be reduced, and in extreme cases might even be below that of the other component in this portion of the column. Thus the component having the lower relative volatility would tend to pass up the column unabsorbed and contaminate the top product. This detrimental condition is not so pronounced in the second column because, other things being equal, its top temperature is higher than that of the first column, with the ratio of the solvent to absorbed component (which reduces the selectivity of the solvent) remaining high.

By substantially uniform temperature we mean that uniformity which can be maintained readily by employing conventional temperature control means. The degree of temperature uniformity that can be attained in any given apparatus depends of course upon its size and the precision of the temperature control instruments available. It may be said that ordinarily large installations are often somewhat more difficult to control precisely than small ones, but in general we prefer to operate in such a manner that the temperature fluctuations are held to a minimum and do not vary more than about 5° C. between any two points in both of the contact zones.

Our process will be more fully understood from the drawing, which represents a flow diagram of one embodiment thereof involving two variations. For purposes of illustration, a vapor feed consisting of two components, A and B, having approximately the same boiling temperatures, is to be separated, A being more soluble than B in a relatively high boiling selective solvent S. Thus, $$\frac{\text{the solubility of } A \text{ in } S}{\text{the solubility of } B \text{ in } S} > 1$$

The first variation, in which lean solvent is mixed with reflux from the condensed overhead vapors and the mixture returned to the contact column, may be illustrated as follows:

The feed, comprising components A and B, is admitted via line 1 to the scrubbing section of the contact column 2 comprising that portion of contact column 2 between the feed port at 1 and solvent port at 3. Column 2 may be a spray, packed or bubble plate tower. In the scrubbing section the feed comes in contact with the solvent S, the solvent preferably being already saturated with component B. The solvent S is admitted to the upper portion of column 2 via line 3. As the solvent flows down through the column it comes in contact with ascending vapor mixture, dissolving component A, which at the same time displaces some of component B. Excess component B rises to the top of column 2 and is removed through vapor line 4, and a portion is withdrawn through valved line 21, as product.

The resulting fat solvent further flows down through the lower rectifying portion of column 2 below the feed port at 1, wherein it is further contacted with an amount of relatively pure vaporous component A, which is admitted to the bottom of column 2, via line 5, to serve as stripping agent to displace from the solvent S whatever component B it may still contain. The amount of component A admitted to the bottom of column 2 should not be more than that which will completely dissolve in solvent S under the conditions of the extraction and should, at the same time, not be less than that amount which will displace a major portion and preferably all of component B from the solvent. Thus, fat solvent S leaves the bottom of column 2 containing substantially only dissolved component A via line 6 and is transferred to fractionating column 7 which is equipped with reboiler 8 and partial condenser 9, the latter for producing reflux. From this fractionating column a vapor stream of substantially pure component A passes overhead and is divided into two portions, one portion recycling through line 10, temperature regulator 11 and line 5 to the bottom of contact column 2, and the remaining portion being withdrawn from the system through line 12 to storage not shown. Lean solvent emerges from the bottom of fractionating column 7 and passes through line 13 and valved line 14 (valve 15 being closed) to cooler-condenser 16 and accumulator 17. Before entering cooler 16 the lean solvent and a portion of component B are combined, the resulting mixture passing to cooler 16 via line 4 and valved line 18 (valves 19 and 21 being properly regulated). In cooler 16, B is condensed to form a true liquid. Valves 19, 26 and 28 are closed and the mixture of solvent and condensed component B is returned to contact column 2 via lines 20 and 3 for use in another cycle (valve 27 being open). The liquid component B is returned to the column as reflux to aid in the separation of components A and B.

In the second variation of our process the lean solvent is not presaturated with condensed overhead vapors. This mode of operation is similar to the manner above described, except that lean solvent passes from the bottom of column 7 through valved line 15 (valves 14, 27 and 28 being closed) through temperature regulator 26 and lines 29 and 3 back to contact column 2. Valve 21 is closed and the overhead vapors of component B pass to cooler-condenser 16 through line 4 and valved line 18, and condensed vapors collect in accumulator 17, a portion returning to contact column 2 via line 20 and valved line 26 as reflux. Condensed B is withdrawn through valved line 19 as product. In this mode of operation the liquid reflux serves to scrub solvent from the overhead vapors in the portion of the column 2 above the solvent port at 3.

As pointed out before, it is essential to the operation of our process that a substantially uniform temperature be maintained throughout column 2 below the solvent feed port at 3. Normally the temperature at the top portion of an ordinary distillation column, e. g., the temperature on the top tray (that is, that portion corresponding to the level of contact column 2 at the solvent feed port at 3) is maintained approximately at the dew point of the reflux. Inasmuch as the optimum extraction temperature is generally higher than this dew point, isothermal operation differs from normal operation in that a higher than normal temperature is maintained in the top of the column. This may be effected by surrounding this column with jacket 22 to which is supplied a heat convection medium such as water, oil, naphthalene, diphenyl, diphenyl oxide, etc., or their vapors, to aid in maintaining the temperature uniform and at the proper level throughout the length of the column. The convection medium can be heated as liquid or vapor in temperature regulator 23, and be circulated through jacket 22 via lines 24 and 25. The choice of substances used as a convection medium depends upon the temperature at which the contact zone is to be operated. The jacket illustrated is especially useful when it is desired to operate this column at temperatures substantially above atmospheric.

If desired, heating or cooling means not shown, such as coils, may be inserted within the column at appropriate points. Such coils may supplement or be substituted for the jacket 22. It is further highly desirable that the temperature of the three streams entering column 2 via lines 1, 3, 5 and 27, respectively, be accurately controlled and be maintained preferably as close to the desired operating temperature as possible.

In the described drawing, simplified embodiments of our invention have been shown and it is understood that variations with respect to the placement of apparatus such as temperature regulators, valves, by-passes, etc., can be made without departing from the spirit of our invention. The proper placement of pumps and other auxiliaries will be evident to one skilled in the art.

Examples of mixtures which may be advantageously fractionated by our process are coke oven gas, low boiling liquid or gaseous hydrocarbons of mixed character, petroleum products such as gasolines or preferably narrow boiling fractions thereof, vaporous mixtures of various isomeric compounds, constant boiling vapor mixtures, etc. Our process is particularly applicable to the separation of substances of different degrees of saturation having substantially the same boiling range, for example the separation of butadiene from butylenes and butanes, or butylenes from butane, or propylene from propane. It can also be suitably employed for the separation of compounds of different degrees of aromaticity such as in the separation of toluene from suitable narrow boiling gasoline fractions, or in the separation of gasoline into fractions of higher and lower octane numbers. It may be employed in desulfurization processes in which gasolines of reduced sulfur content are produced with the aid of solvents which selectively extract the sulfur compounds; and it may also be used in the dehydration of alcohols, ketones, formic acid, acetic acid and other organic compounds with the aid of solvents preferentially dissolving the organic compound and having boiling temperatures substantially above the operating temperature. In general our process is not limited to treatment of vapors of substances which exist as vapors under normal conditions of temperature and pressure. When it is desired to treat substances which are liquids at ordinary temperatures, it is possible either to vaporize them before they enter the contact zone or to feed them as liquids to the contact zone in which latter case they become vapors within the zone. When feeding liquids, it is usually advantageous to supply a heating coil at the point where the feed enters the contact zone to prevent local cooling and thus better to maintain the temperature uniform throughout the length of the contact zone.

Depending on the mixtures to be separated, different solvents may be employed. For example, in the recovery of diolefines from olefines, the following solvents, which are selective for the diolefines, are suitable: nitromethane, furfural, acetone, methyl ethyl ketone, dioxane, acetonitrile, solutions of cuprous chloride in water or aliphatic amines, etc. If desired, the solvent may be one which is more selective for the more saturated hydrocarbons, e. g., cyclohexane, higher paraffin petroleum oils, etc. In the separation of toluene from gasoline or in the desulfurization of alkyl phenols, furfural, aniline, nitrobenzene, beta-beta'-dichlorethyl ether, ethyl carbitol, etc., may be employed.

While the amount of solvent employed in our process will vary with the particular requirements for any given case, in general we prefer to use enough solvent to dissolve a major portion of the constituent to be extracted, but not substantially more than is necessary for this. The proper amount for an individual case can be easily determined by simple experiments. In general, any solvent may be employed in our process which has greater solvent power for at least one of the constituents of the vapor mixture which is to be separated, which has a boiling temperature high enough so that it can be readily separated by fractional distillation from the dissolved lower boiling constituent and which is chemically and thermally stable under the conditions of extraction and separation.

It is not necessary always to employ a pure solvent. Sometimes selectivity of a given solvent for a particular component in a mixture can be increased by the addition of some second agent which modifies the solubility properties of the solvent. Thus it is sometimes desirable to use mixed solvents or solvents which have some modifying agent added, such as water soluble solvents containing water; e. g., butadiene can be separated from butylenes by employing an acetone-water mixture as solvent.

Example

A mixture of 39% butadiene, 19.7% isobutylene, 39.9% n-butylenes, 1.4% saturates, presumably butane, in the vapor state, was countercurrently extracted in a forty-plate extraction column with a solution of 20% water and 80% acetone. The butadiene feed mixture entered the column about one-third the distance from the top. Overhead vapors were condensed by contact with returned solvent and the resulting reflux admitted to the column along with the solvent. Isothermal operation was compared with extractive distillation under the conditions described below. The vapors of the feed and the solvent in the isothermal operation were maintained at the same temperature, the column being jacketed by a recirculating water jacket. In the extractive distillation, no jacket was used. The pressures maintained in both runs were substantially atmospheric.

|  | Isothermal | Extractive distillation |
|---|---|---|
| Column temperature top..........° C.. | 14 | 5.4 |
| Column temperature bottom......° C.. | 14 | 16.4 |
| Solvent feed rate..............cc./min.. | 22 | 22 |
| Pounds of solvent per pound of feed... | 24 | 24 |
| Feed rate.....................cc./min.. | 300 | 300 |
| Reflux ratio (solvent free basis)........ | 15:1 | 15:1 |

The analysis of the products follows:

|  | Isothermal | Extractive distillation |
|---|---|---|
|  | Per cent | Per cent |
| Butadiene in feed......................... | 39.1 | 39.1 |
| Butadiene content off top product..... | 1.8 | 7.1 |
| Butadiene off bottom .................... | 98+ | 98+ |

The above data show that the isothermal operation is considerably more efficient, only 1.8% butadiene being lost in top products as compared to 7.1% in the case of extractive distillation under otherwise identical conditions.

We claim as our invention:

1. In a process for fractionating a relatively narrow boiling vapor mixture comprising components of greater and lesser solubility in a selective liquid solvent in an extraction system, the steps comprising contacting said mixture in the vapor phase with said liquid solvent in a first contact zone wherein said solvent dissolves preferentially at least a portion of said component of greater solubility as well as the lesser portion of said component of lesser solubility, under conditions to take overhead undissolved vapors, condensing at least a portion of said overhead vapors, and returning condensed vapors to said extraction system as reflux, passing the resulting solvent through a second contact zone wherein it is contacted with substantially pure vapors of said component of greater solubility under conditions to displace at least a portion of said component of lesser solubility, and maintaining in both said contact zones substantially the same temperature.

2. The process of claim 1 wherein said temperature is above the dew temperature of said reflux.

3. The process of claim 1 wherein said temperature is between about 5 and 25° C. above the dew point of said reflux.

4. The process according to claim 1 wherein said components are isomers.

5. The process according to claim 1 wherein said reflux is mixed with said solvent prior to returning it to said first contact zone.

6. The process according to claim 1 wherein said reflux passes back to said extraction system independently of said solvent, whereby solvent vapors are prevented from passing overhead.

7. In a process for fractionating a relatively narrow boiling vapor mixture comprising components of greater and lesser solubility in a selective liquid solvent, the steps comprising contacting said mixture in the vapor phase with said liquid solvent in a first contact zone wherein said solvent dissolves preferentially at least a portion of said component of greater solubility as well as the lesser portion of said component of lesser solubility, under conditions to take overhead undissolved vapors, condensing at least a portion of said overhead vapors, returning condensed vapors to said extraction system as reflux, passing the resulting solvent through a second contact zone wherein it is contacted with substantially pure vapors of said component of greater solubility, said pure vapors being employed in an amount sufficient to displace at least a portion of said component of lesser solubility and not greater than will completely dissolve in said solvent under the conditions of the process, and maintaining in both said reaction zones substantially the same temperature above the dew point of said reflux.

8. In a process for fractionating a relatively narrow boiling mixture of substances of different degrees of saturation, the more saturated substances being less soluble in a selective liquid solvent than the less saturated substances, the steps comprising contacting said mixture in the vapor phase with said liquid solvent in a first contact zone wherein said solvent dissolves preferentially at least a portion of said substance of less saturation as well as the lesser portion of said more saturated substance, under conditions to condensing at least a portion of said overhead vapors, and returning condensed vapors to said extraction system as reflux, passing the resulting solvent through a second contact zone wherein it is contacted with substantially pure vapors of said substance of less saturation, under conditions to displace at least a portion of said more saturated substance, and maintaining in both said reaction zones substantially the same temperature above the dew temperature of said reflux.

9. A process according to claim 8 wherein said temperature is maintained at a level corresponding to the maximum volatility ratio of said substances in the presence of said solvent.

10. The process according to claim 8 in which said pure vapors are employed in an amount sufficient to displace at least a portion of said more saturated substance and not greater than will completely dissolve under the conditions of the process.

11. In a process for fractionating a mixture of butadiene and butylenes, the steps comprising contacting said mixture in the vapor phase with a liquid selective solvent for one of the components of said mixture in a first contact zone wherein said liquid solvent dissolves preferentially at least a portion of the more soluble component as well as a lesser portion of the less soluble component, under conditions to take overhead undissolved vapors, condensing at least a portion of said overhead vapors and returning condensed vapors to said extraction system as reflux, passing the resulting liquid solvent through a second contact zone wherein it is contacted with substantially pure vapors of said more soluble component under conditions to displace at least a portion of said less soluble component and maintaining in both said contact zones substantially the same temperature above the dew point of said reflux.

12. In a process for fractionating a mixture of butadiene and butylenes, the steps comprising contacting said mixture in the vapor phase with a liquid selective solvent for butadiene in a first contact zone wherein said liquid solvent dissolves preferentially at least a portion of said butadiene, as well as a lesser portion of said butylene, under conditions to take overhead undissolved vapors, condensing at least a portion of said overhead vapors, and returning condensed vapors to said extraction system as reflux, passing the resulting liquid solvent through a second contact zone wherein it is contacted with substantially pure vapors of butadiene under conditions to displace at least a portion of said butylenes and maintaining in both said contact zones substantially the same temperature above the dew point of said reflux.

13. In a continuously regenerative process for fractionating a relatively narrow boiling vapor mixture comprising components of greater and lesser solubility in a selective liquid solvent, the steps comprising contacting said mixture in the vapor phase with said lean liquid solvent in a first contact zone wherein said solvent dissolves preferentially at least a portion of said component of greater solubility as well as a smaller portion of said component of lesser solubility under conditions to take overhead undissolved vapors, condensing at least a portion of said overhead vapors and returning condensed vapors to said extraction system as reflux, passing the resulting solvent through a second contact zone wherein it is contacted with an amount of substantially pure vapors of said component of greater solubility, said amount being sufficient to displace at least a major portion of said component of lesser solubility, and not more than will dissolve substantially completely in said solvent under the conditions of the process, thereby forming a fat solvent, maintaining in both said reaction zones substantially the same temperature above the dew point of said reflux, stripping said fat solvent in a distillation zone to produce lean solvent and substantially pure vapors of said component of greater solubility, returning said lean solvent to said first contact zone, and dividing said pure vapors into two portions, one of which is returned to said second contact zone to effect said displacement of said remaining component of lesser solubility and another portion which is withdrawn.

14. In a continuously regenerative process for fractionating a relatively narrow boiling vapor mixture comprising components of greater and lesser solubility in a selective liquid solvent, the steps comprising introducing said mixture in the vapor phase into a first contact zone, introducing said solvent into said contact zone under conditions to dissolve preferentially at least a portion of said component of greater solubility as well as a smaller portion of said component of lesser solubility, under conditions to take overhead undissolved vapors, condensing at least a portion of said overhead vapors, and returning condensed vapors to said extraction system, passing the resulting solvent through a second contact zone, introducing into said second contact zone an amount of substantially pure vapors of said component of greater solubility, contacting said solvent with said pure vapors, said amount of pure vapors being sufficient to displace at least a major portion of said component of lesser solubility, and not more than will dissolve substantially completely in said solvent, thereby forming a fat solvent, controlling the temperatures of said solvent in said mixture and said vapors at their respective points of introduction, so as to maintain both said contact zones at substantially the same temperature above the dew point of said reflux, stripping said fat solvent in a distillation zone, to produce lean solvent and substantially pure vapors of said component of greater solubility, returning said lean solvent to said first contact zone and dividing said pure vapors into two portions, one of which is returned to said second contact zone to effect said displacement of said remaining component of lesser solubility and another portion, which is withdrawn.

15. In a process for fractionating a relatively narrow boiling vapor mixture comprising components of greater and lesser solubility in a selective liquid solvent, the steps comprising contacting said mixture in the vapor phase with said liquid solvent in a first contact zone wherein said solvent dissolves preferentially at least a portion of said component of greater solubility as well as a lesser portion of said component of lesser solubility, under conditions to take overhead undissolved vapors, condensing at least a portion of said overhead vapors, and returning condensed vapors to said extraction system as reflux, passing the resulting solvent through a second contact zone wherein it is contacted with substantially pure vapors of said component of greater solubility under conditions to displace at least a portion of said component of lesser solubility, and circulating a single heat convection medium in indirect heat exchange relation with both said zones to maintain a substantially uniform temperature in the zones above the dew point of said reflux.

THEODORE W. EVANS.
RUPERT C. MORRIS.